G. J. RACKHAM.
TRACK FOR ENDLESS TRACK VEHICLES.
APPLICATION FILED AUG. 16, 1922.

1,434,630.

Patented Nov. 7, 1922.

Inventor
George John Rackham
by his Attorneys
Baldwin & Wight

G. J. RACKHAM.
TRACK FOR ENDLESS TRACK VEHICLES.
APPLICATION FILED AUG. 16, 1922.
1,434,630.
Patented Nov. 7, 1922.
2 SHEETS—SHEET 2.
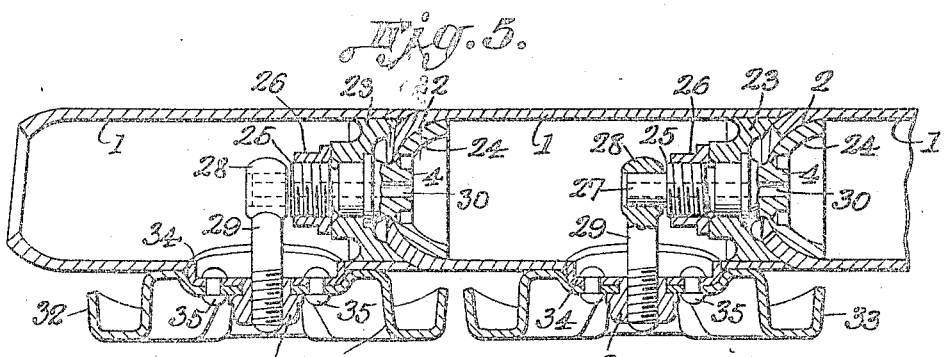
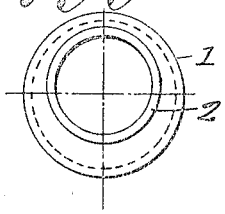
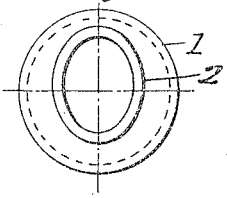
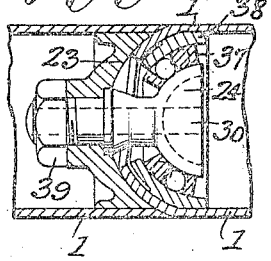
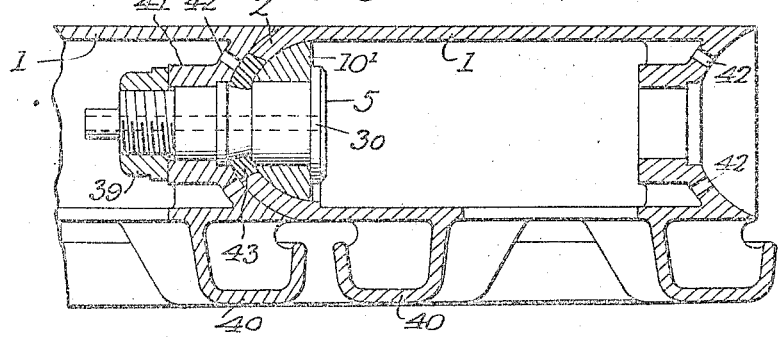
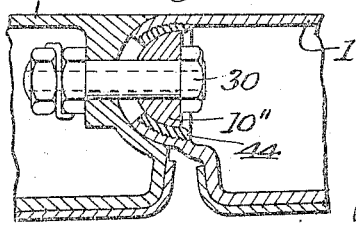
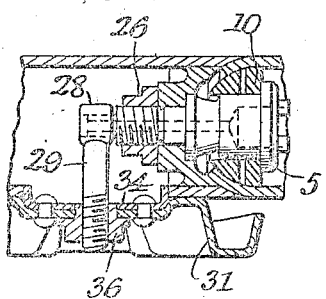
Inventor
George John Rackham
by his Attorneys
Baldwin & Wight Patented Nov. 7, 1922.

1,434,630

UNITED STATES PATENT OFFICE.

GEORGE JOHN RACKHAM, OF LONDON, ENGLAND, ASSIGNOR TO ROADLESS TRACTION, LIMITED, OF LONDON, ENGLAND.

TRACK FOR ENDLESS-TRACK VEHICLES.

Original application filed June 14, 1922, Serial No. 568,223. Divided and this application filed August 16, 1922. Serial No. 582,264.

*To all whom it may concern:*

Be it known that I, GEORGE JOHN RACKHAM, a subject of the King of Great Britain, and resident of London, England, have invented certain new and useful Improvements in Tracks for Endless-Track Vehicles, of which the following is a specification.

My invention relates particularly to improvements in tracks for endless track vehicles in which the track shoes are connected to links which are pivotally connected to each other.

According to this invention, the links are tubular and similar, and adjacent links are connected by universal joints that hold the links in constant engagement but permit relative movement therebetween. Each tube is contracted at one end forming an external spherical surface which engages with an internal spherical surface of similar curvature formed by a plug inserted into the end of or made in one piece with the adjacent tube. Adjacent tubes are connected together by a screw bolt having a spherical head which engages with the internal surface of the contracted end of one tube and passes through the plug in the adjacent tube, suitable means being provided for holding the bolt in place. The bolt may be made with a flat head and provided with a spherical washer which engages with the internal spherical surface of the contracted end of the tube.

The tubular links are adapted to hold lubricant, and the bolt holds the two links together closely enough to prevent the escape of the lubricant. Preferably the bolt is hollow thus permitting the passage of lubricant from one tubular link to another.

In order to allow of clearance between the tubes, the radius of curvature of the external concave or convex ends is greater than the radius of the tube. The hole in the tube through which the bolt passes is preferably at an angle to the axis of the tube in order to allow the tube to turn a greater distance in an upward direction than in a downward. As an alternative form, the hole may be oval.

Each tube carries a shoe which is so formed that the movement downward of the tubes is limited. Each shoe may be formed of a dished plate having upwardly turned ends and having teeth which engage with the driving sprocket, and a plate, preferably of oval shape is secured to the dished plate and enters a similarly shaped hole in the tube, the plate being secured to the tube by bolts.

A track formed in accordance with this invention may be turned sideways so as to permit the vehicle to be steered by laying the track in a curve, and individual track shoes are capable of turning so that the whole shoe can turn when laid on uneven ground, and each link being hollow and entirely closed can be filled with lubricant.

Other objects of the invention will be apparent from the following detailed description and the appended claims.

In the drawings:

Figure 5 is a longitudinal section of a modification.

Figure 6 is a left hand view of one of the links.

Figure 7 is a similar view of a modification.

Figure 8 is a longitudinal section of the ends of two links in a modified form fitted with ball bearings.

Figure 9 is a longitudinal section of a modified form of track.

Figure 10 is a similar view of a further modification in which one of the spherical sections is lined with white metal.

Figure 11 is a longitudinal section of a different arrangement.

Figure 1:
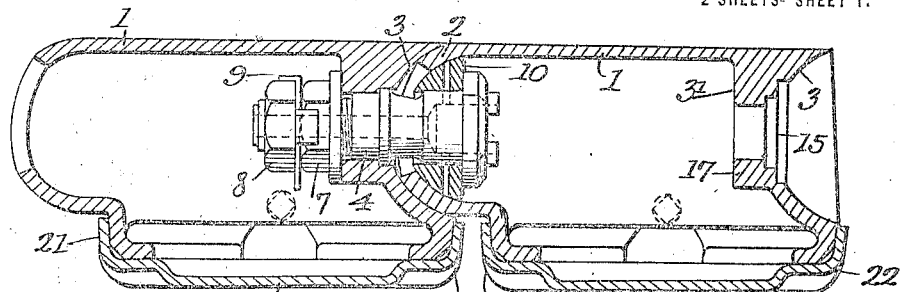
Figure 1 is a longitudinal section of a pair of links and the means for joining them, parts being shown in elevation.
Figure 2:
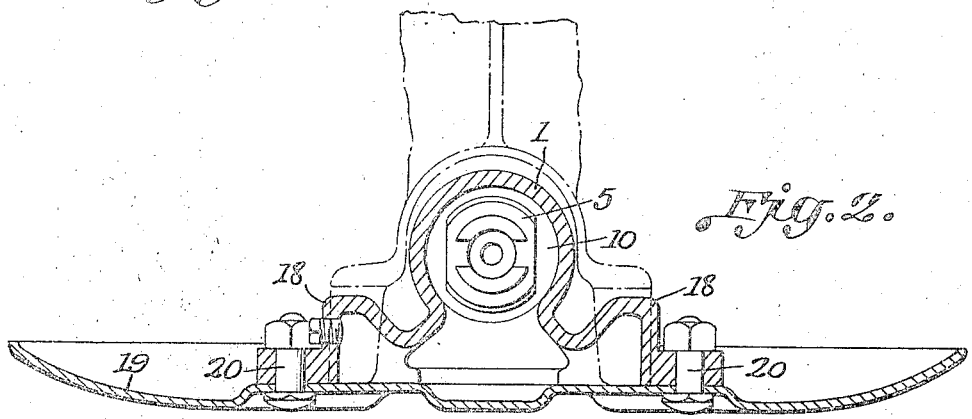
Figure 2 is a transverse section of the same structure.
Figures 3, 4:
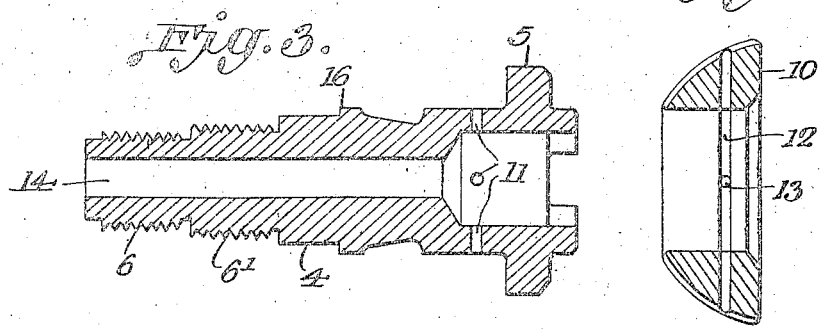
Figure 3 is a longitudinal section of the bolt connecting the two sections shown in the form of Figures 1 and 2.
Figure 4 is a longitudinal section of the washer.

The tubes 1 are identical in shape and each has at its left hand end an external spherical surface 2 which coacts with an internal spherical surface 3 formed on an inwardly extending enlargement 3' at the right hand end of the adjacent tube. The tubes are held together by a bolt 4 having a head 5 at one end and two threaded portions 6 and 6' at the other end. One of these is a right hand thread and one a left hand thread, and they are engaged by similarly threaded nuts 7 and 8 between which is a locking plate 9. Between the head 5 of the bolt and the inner surface of the adjacent contracted end of the tube is a washer 10 having a spherical surface. The bolt 4 has an opening 11 for the passage of lubricant and the washer has a groove 12 and holes 13 for a similar purpose. The bolt also has a central opening 14 passing from one end to the other to permit the passage of lubricant from one tube to the other. The enlargement 3' has a depression 15 into which fits a shoulder 16 on the bolt 4, while the nut 7 fits tightly against the inner smooth surface 17 of this enlargement.

Integral with the tubular links are portions 18 which act as driving teeth and engage the sprocket wheels around which the endless track passes in the usual manner. Shoes 19 in the form of dished plates are fastened to the tubes by bolts 20. These shoes have upturned end portions 21 and 22.

In the form of the device shown in Figure 5 the spherical surface 2 of the tube 1 coacts with a spherical surface on a plug 23 fitted inside the tube. The bolt 4 has a spherical head 24 integral therewith and passes through the plug 23 and has on its end a screw thread 25 upon which screws a nut 26. The extreme end of the bolt is smooth as at 27 and an eye 28 fits over it, the eye being formed on one end of a screw bolt 29. A passage 30 extends through the bolt to permit lubricant to pass from one tube to the other.

Track shoes 31 having upturned ends 32 and 33 are fastened to plates 34 by bolts 35. These plates fit within openings in the tube and close the same. The screw threaded end of the bolt 29 passes through the plate and shoe and a nut 36 screws thereon to hold the parts in position.

Figure 6 shows the off center position of the opening in the end of the tube, and Figure 7 shows a modification in which it is made oval.

In the modification shown in Figure 8, two rows of balls are in a case 37 between the head 24 of the bolt and a washer 38 inserted within the inturned end of the tube. A single nut 39 holds the bolt in place and the usual passage 30 extends through the bolt.

In the form shown in Figure 9, the track shoes 40 and plug 41 are cast in one piece with the tube 1. Holes 42 are provided in the plug 41 and felt 43 is interposed between the plug 41 and the washer 10'. The bolt has the usual passageway 30 therethrough and is held in place by a nut 39.

The modification shown in Figure 10 has a lining of white metal 44 interposed between the washer 10'' and the interior surface of the inturned end of the tube 1. The bolt is held in place as in Figure 1 and has the passageway 30 therethrough.

The modification shown in Figure 11 has the washer 10 and hollow bolt shown in Figure 1, but employs the form of track shoe 31 shown in Figure 5, and has the screw bolt 29 with eye 28 holding the track shoe and plate 34 in position through the nut 36 all as shown in said Figure 5. As in all other forms the bolt is hollow and permits passage of lubricant from one link to the other.

In all of the forms it will be noted that each link can have free turning movement relative to the adjacent links, but the contacting spherical surfaces are held in engagement by the bolts so that the lubricant cannot escape. Free passage of the lubricant from one tube to another is provided for. In the form shown in Figure 1, the opening in the tube through which the bolts are inserted is closed by the track shoe itself, while in the form shown in Figure 5, the track shoe is carried by a plate which fits within the said opening and closes it. In both cases any escape of the lubricant is prevented.

This application is a division of my application Serial No. 568,223, filed June 14, 1922.

Minor changes can be made without departing from the spirit of the invention which is to be regarded as limited only by the scope of the appended claims.

I claim as my invention:

1. Tracks for endless track vehicles comprising tubular links each having an external spherical surface at one end and an internal spherical surface at the other end, means connecting the tubular links and holding the spherical surfaces in close contact, said means permitting the passage of lubricant from one tubular link to the other.

2. Tracks for endless track vehicles comprising tubular links having coacting spherical surfaces at their adjacent ends, means connecting the tubular links and holding the spherical surfaces in close contact, said means permitting the passage of lubricant from one tubular link to the other.

3. Tracks for endless track vehicles comprising tubular links having coacting spherical surfaces at their adjacent ends, and a bolt connecting the tubular links and holding the spherical surfaces in close contact, said bolt being hollow for the passage of lubricant from one link to the other.

4. Tracks for endless track vehicles comprising tubular links having coacting spherical surfaces at their adjacent ends, a bolt connecting the tubular links and holding the spherical surfaces in close contact, and a hemispherical metal washer on said bolt, said bolt being hollow for the passage of lubricant from one link to the other.

5. Tracks for endless track vehicles comprising tubular links having coacting spherical surfaces at their adjacent ends, a bolt connecting the tubular links and holding the spherical surfaces in close contact, and a hemispherical metal washer on said bolt, said bolt being hollow for the passage of lubricant from one link to the other and said washer having passageways for lubricant.

6. Tracks for endless track vehicles comprising tubular links each having an external spherical surface at one end and an internal spherical surface at the other end, bolts connecting the links and hemispherical metal washers on said bolts, said bolts being hollow for the passage of lubricant from one link to the other.

7. Tracks for endless track vehicles comprising tubular links each having an external spherical surface at one end and an internal spherical surface at the other end, bolts connecting the links, and hemispherical metal washers on said bolts, said bolts being hollow for the passage of lubricant from one link to the other and said washers having passageways for lubricant.

8. Tracks for endless track vehicles comprising tubular links each having an external spherical surface at one end and an internal spherical surface at the other end, a bolt connecting each two adjacent links and being hollow for the passage of lubricant, shoes each comprising a plate with upwardly turned ends and means for connecting the shoes to the links.

9. Tracks for endless track vehicles comprising tubular links each having an external spherical surface at one end and an internal spherical surface at the other end, a bolt connecting each two adjacent links and being hollow for the passage of lubricant, a hemispherical washer on said bolt, shoes each comprising a plate with upwardly turned ends and means for connecting the shoes to the links.

10. Tracks for endless track vehicles comprising tubular links each having an external spherical surface at one end and an internal spherical surface at the other end, a bolt connecting each two adjacent links and being hollow for the passage of lubricant, a hemispherical washer on the bolt, shoes each so formed as to limit the downward movement of the links, and means for connecting the shoes to the links.

11. Tracks for endless track vehicles comprising tubular links having coacting spherical surfaces, a bolt connecting each two adjacent links and being hollow for the passage of lubricant, a hemispherical washer on said bolt, shoes, and means for connecting the shoes to the links.

12. Tracks for endless track vehicles comprising tubular links having coacting spherical surfaces, a bolt connecting each two adjacent links and holding the spherical surfaces in close contact, shoes each comprising a plate with upwardly turned ends, means for connecting the shoes to the links, and driving teeth made integral with the link, said bolt being hollow for the passage of lubricant.

13. Tracks for endless track vehicles comprising tubular links having coacting spherical surfaces, a bolt connecting each two adjacent links and holding the spherical surfaces in close contact, a hemispherical washer on said bolt, shoes each comprising a plate with upwardly turned ends, means for connecting the shoes to the links, and driving teeth made integral with the link, said bolt being hollow for the passage of lubricant.

In testimony whereof, I have hereunto subscribed my name.

GEORGE JOHN RACKHAM.